(12) United States Patent
Zhang

(10) Patent No.: US 11,019,325 B2
(45) Date of Patent: May 25, 2021

(54) IMAGE PROCESSING METHOD, COMPUTER DEVICE AND READABLE STORAGE MEDIUM

(71) Applicant: GUANGDONG OPPO MOBILE TELECOMMUNICATIONS CORP., LTD., Guangdong (CN)

(72) Inventor: Xueyong Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 30 days.

(21) Appl. No.: 16/429,780

(22) Filed: Jun. 3, 2019

(65) Prior Publication Data

US 2019/0379880 A1 Dec. 12, 2019

(30) Foreign Application Priority Data

Jun. 6, 2018 (CN) .......................... 201810575109.6

(51) Int. Cl.
*G06T 7/55* (2017.01)
*G06T 7/33* (2017.01)
(Continued)

(52) U.S. Cl.
CPC .............. *H04N 13/25* (2018.05); *G06T 7/33* (2017.01); *G06T 7/55* (2017.01); *H04N 13/156* (2018.05);
(Continued)

(58) Field of Classification Search
CPC .... H04N 13/25; H04N 13/156; H04N 13/239; G06T 7/55; G06T 7/33; G06T 7/521;
(Continued)

(56) References Cited

U.S. PATENT DOCUMENTS 9,648,302 B2 5/2017 Xie et al.
9,843,788 B2 12/2017 Xie et al.
(Continued)

FOREIGN PATENT DOCUMENTS

| CN | 104539928 A | 4/2015 |
|---|---|---|
| CN | 105980928 A | 9/2016 |
| CN | 108961195 A | 12/2018 |

OTHER PUBLICATIONS

Neverova Natalia et al: "21/2D Scene Reconstruction of Indoor Scenes from Single RGB-D Images", Mar. 3, 2013 (Mar. 3, 2013), International Conference on Computer Analysis of Images and Patterns. CAIP 2017: Computer Analysis of Images and Patterns; [Lecture Notes in Computer Science; Berlin, Heidelberg, pp. 281-295, XP047470349, ISBN: 978-3-642-17318-9 * section 2.1.

(Continued)

*Primary Examiner* — David F Dunphy

(57) ABSTRACT

An image processing method, an image capturing apparatus (100), a computer device (1000) and a non-volatile computer-readable storage medium (200) are provided. The image processing method includes that: a first depth image of a present scene is acquired; a first visible light image of the present scene is acquired; a coincidence region between the first depth image and the first visible light image, a non-coincidence region of the first depth image and a non-coincidence region of the first visible light image are acquired; the non-coincidence region of the first depth image is removed to obtain a second depth image corresponding to the coincidence region; a non-coincidence region of the first visible light image is removed to obtain a second visible light image corresponding to the coincidence region; and a three-dimensional image is synthesized according to the second depth image and the second visible light image.

6 Claims, 7 Drawing Sheets

(51) Int. Cl.
*H04N 13/25* (2018.01)
*H04N 13/239* (2018.01)
*H04N 13/156* (2018.01)
*G06T 7/521* (2017.01)

(52) U.S. Cl.
CPC ........... *H04N 13/239* (2018.05); *G06T 7/521* (2017.01); *G06T 2207/10024* (2013.01); *G06T 2207/10028* (2013.01); *G06T 2207/10048* (2013.01); *G06T 2207/20221* (2013.01)

(58) Field of Classification Search
CPC . G06T 2207/10024; G06T 2207/10028; G06T 2207/10048; G06T 2207/20221
See application file for complete search history.

(56) References Cited

U.S. PATENT DOCUMENTS

| | | | |
|---|---|---|---|
| 9,953,403 B2 | 4/2018 | Podnar | |
| 2015/0281678 A1 | 10/2015 | Park et al. | |
| 2016/0134858 A1 | 5/2016 | Xie et al. | |
| 2016/0300361 A1* | 10/2016 | Xie | H04N 13/128 |
| 2017/0195655 A1 | 7/2017 | Xie et al. | |
| 2017/0358062 A1 | 12/2017 | Podnar | |

OTHER PUBLICATIONS

European Search Report in the European application No. 19178275.4, dated Sep. 11, 2019.
Decision of Refusal of the Taiwanese application No. 108117784, dated Mar. 26, 2020.
Third Office Action of the Chinese application No. 201810575109.6, dated May 29, 2020.
International Search Report in the international application No. PCT/CN2019/075385, dated Apr. 17, 2019.
Written Opinion of the International Search Authority in the international application No. PCT/CN2019/075385, dated Apr. 17, 2019.
Office Action of the Indian application No. 201914021904, dated Sep. 21, 2020.
Fourth Office Action of the Chinese application No. 201810575109.6, dated Oct. 16, 2020.
First Office Action after Refusal of the Taiwanese application No. 108117784, dated Nov. 25, 2020.

* cited by examiner

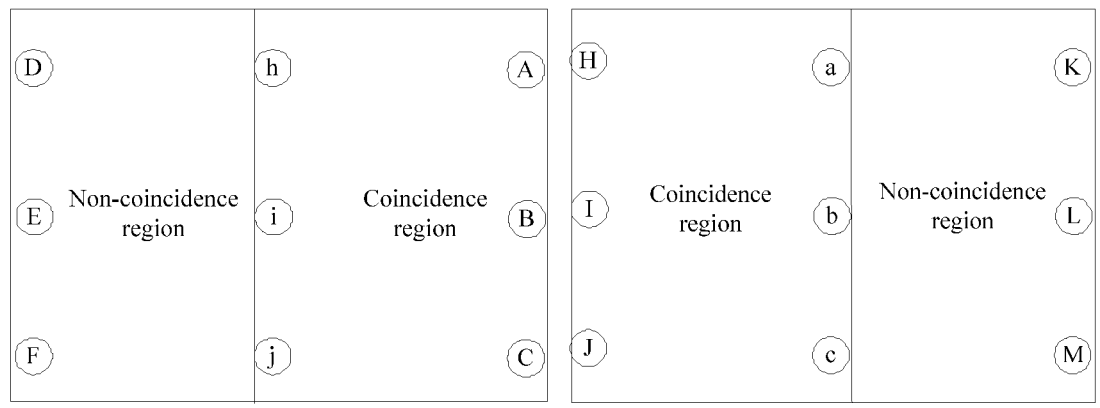
FIG. 10  FIG. 11
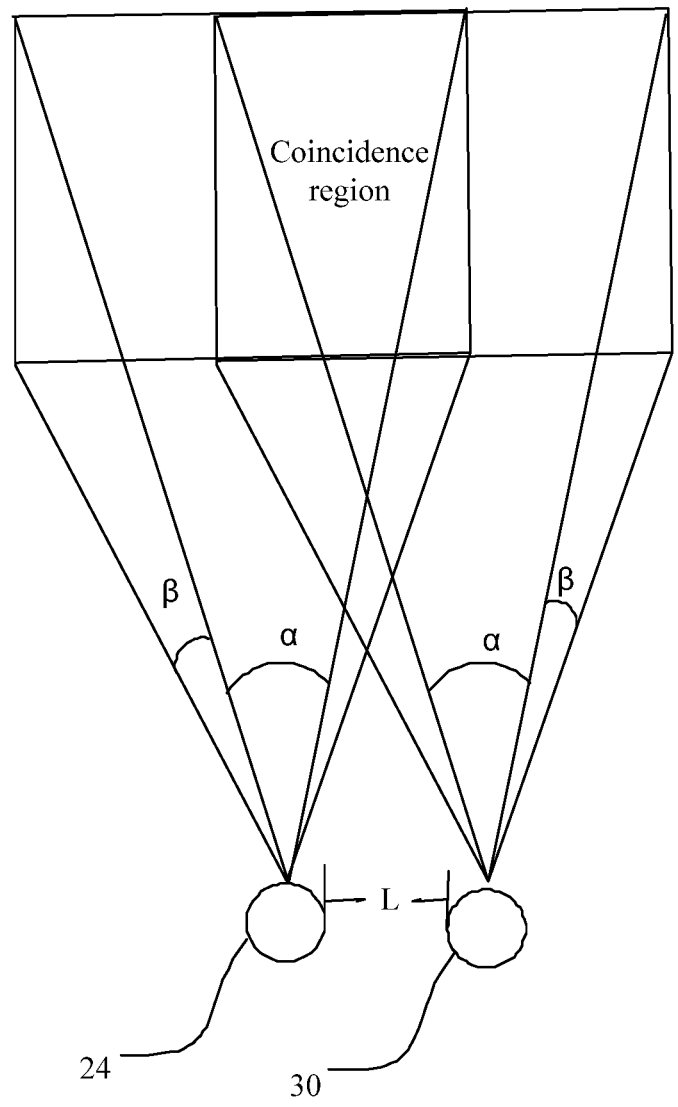
FIG. 12

IMAGE PROCESSING METHOD, COMPUTER DEVICE AND READABLE STORAGE MEDIUM

CROSS-REFERENCE TO RELATED APPLICATIONS

This application claims priority to Chinese Patent Application No. 201810575109.6, filed on Jun. 6, 2018, the disclosure of which is hereby incorporated by reference in its entirety.

TECHNICAL FIELD

The disclosure relates to the field of image processing, and in particular to an image processing method, an image capturing apparatus, a computer device and a non-volatile computer-readable storage medium.

BACKGROUND

At present, an image capturing apparatus for generating a three-dimensional image generally includes a visible light camera and an Infrared Radiation (IR) camera. The visible light camera is used to acquire a visible light image, the IR camera is used to acquire a depth image, and then the visible light image and the depth image are synthesized to obtain a three-dimensional image.

BRIEF DESCRIPTION OF DRAWINGS

The above and/or additional aspects and advantages of the disclosure will become apparent and readily understood from the descriptions of the embodiments in combination with the accompanying drawings.

FIG. 10 illustrates a schematic diagram of the principle of an image processing method according to some embodiments of the disclosure.

FIG. 11 illustrates a schematic diagram of the principle of an image processing method according to some embodiments of the disclosure.

FIG. 12 illustrates a schematic diagram of the principle of an image processing method according to some embodiments of the disclosure.

DETAILED DESCRIPTION

Figure 1:
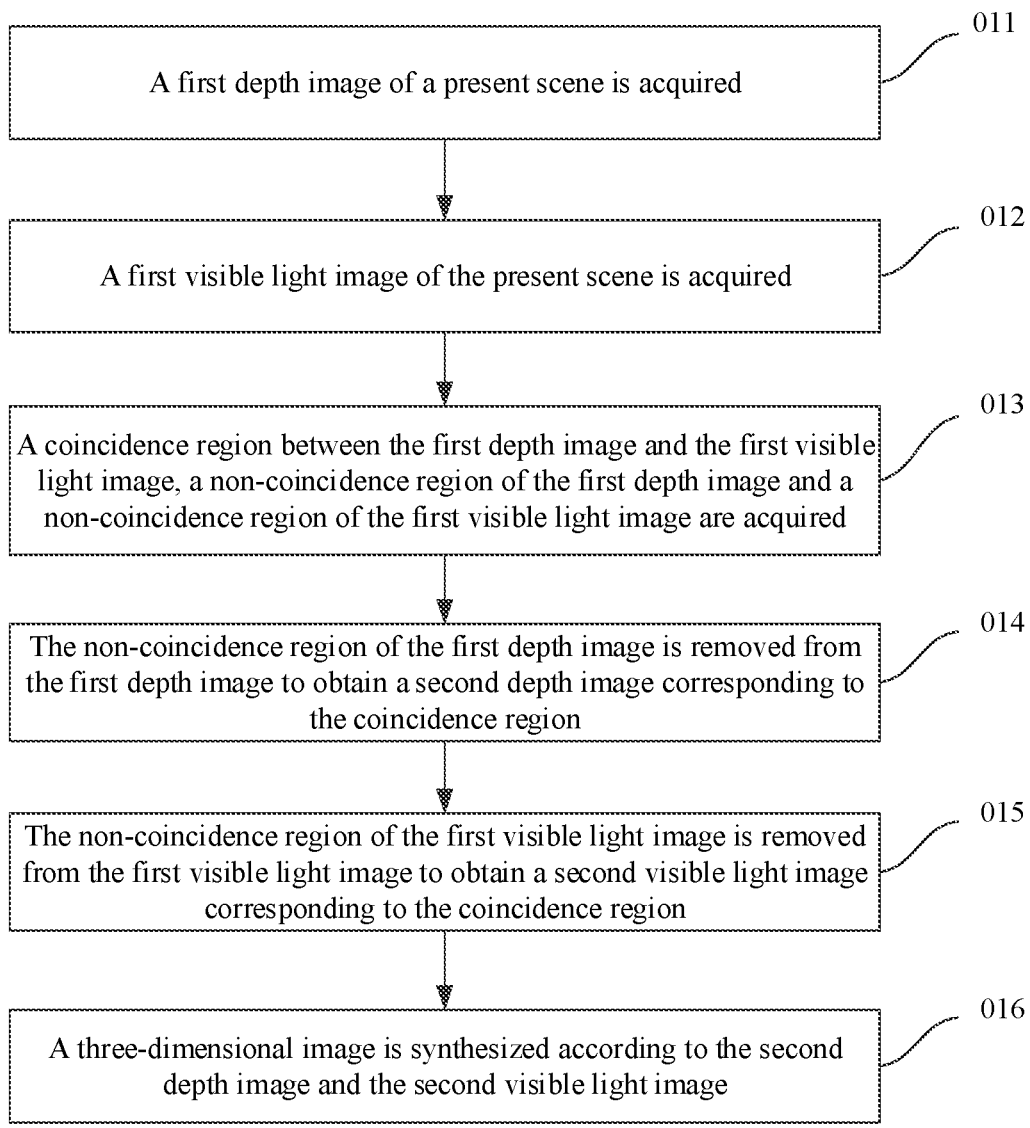
FIG. 1 illustrates a schematic flowchart of an image processing method according to some embodiments of the disclosure.

The embodiments of the disclosure are described in detail below, and examples of the embodiments are illustrated in the drawings, in which the same or similar reference numerals are used to denote the same or similar elements or elements having the same or similar functions. The embodiments described below with reference to the drawings are illustrative only used to explain the disclosure and not intended to limit the disclosure.

Embodiments of the disclosure provides an image processing method, an image capturing apparatus, a computer device and a non-volatile computer-readable storage medium.

In an embodiment of the disclosure, the image processing method may include the following operations. A first depth image of a present scene is acquired. A first visible light image of the present scene is acquired. A coincidence region between the first depth image and the first visible light image, a non-coincidence region of the first depth image and a non-coincidence region of the first visible light image are acquired. The non-coincidence region of the first depth image is removed from the first depth image to obtain a second depth image corresponding to the coincidence region. The non-coincidence region of the first visible light image is removed from the first visible light image to obtain a second visible light image corresponding to the coincidence region. A three-dimensional image is generated according to the second depth image and the second visible light image.

In an embodiment of the disclosure, the image capturing apparatus may include a depth camera module, a visible light camera and a processor. The depth camera module may be configured to capture a first depth image of a present scene. The visible light camera may be configured to capture a first visible light image of the present scene. The processor may be configured to acquire a coincidence region between the first depth image and the first visible light image, a non-coincidence region of the first depth image and a non-coincidence region of the first visible light image, remove the non-coincidence region of the first depth image from the first depth image to obtain a second depth image corresponding to the coincidence region, remove the non-coincidence region of the first visible light image from the first visible light image to obtain a second visible light image corresponding to the coincidence region, and synthesize a three-dimensional image according to the second depth image and the second visible light image.

In an embodiment of the disclosure, the computer device may include a memory and a processor. The memory may store a computer-readable instruction. The computer-readable instruction, when executed by the processor, causes the processor to perform the following operations for image processing. A first depth image of a present scene is acquired. A first visible light image of the present scene is acquired. A coincidence region between the first depth image and the first visible light image, a non-coincidence region of the first depth image and a non-coincidence region of the first visible light image are acquired. The non-coincidence region of the first depth image is removed from the first depth image to obtain a second depth image corresponding to the coincidence region. The non-coincidence region of the first visible light image is removed from the first visible light image to obtain a second visible light image corresponding to the coincidence region. A three-dimensional image is generated according to the second depth image and the second visible light image.

In an embodiment of the disclosure, one or more non-volatile computer-readable storage media may include computer-executable instructions. The computer-executable instructions, when executed by one or more processors, cause the one or more processors to perform the following operations for image processing. A first depth image of a present scene is acquired. A first visible light image of the present scene is acquired. A coincidence region between the first depth image and the first visible light image, a non-coincidence region of the first depth image and a non-coincidence region of the first visible light image are acquired. The non-coincidence region of the first depth image is removed from the first depth image to obtain a second depth image corresponding to the coincidence region. The non-coincidence region of the first visible light image is removed from the first visible light image to obtain a second visible light image corresponding to the coincidence region. A three-dimensional image is generated according to the second depth image and the second visible light image.

Additional aspects and advantages of the embodiments of the disclosure will be set forth in part in the following description and in part, will be apparent from the following description, or will be learned by the practice of the disclosure.

Figure 15:
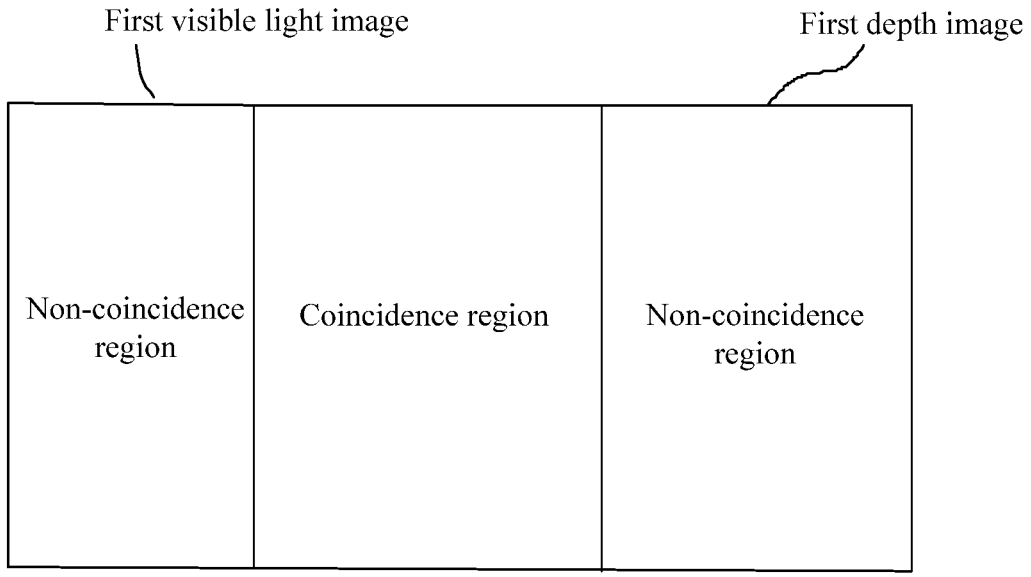
FIG. 15 illustrates a schematic diagram of the principle of an image processing method according to some embodiments of the disclosure.

Referring to FIG. 1, an image processing method of the embodiment of the disclosure includes the following operations. At 011, a first depth image of a present scene is acquired. At 012, a first visible light image of the present scene is acquired. At 013, a coincidence region between the first depth image and the first visible light image, a non-coincidence region of the first depth image and a non-coincidence region of the first visible light image are acquired. At 014, the non-coincidence region of the first depth image is removed from the first depth image to obtain a second depth image corresponding to the coincidence region. At 015, the non-coincidence region of the first visible light image is removed from the first visible light image to obtain a second visible light image corresponding to the coincidence region. At 016, a three-dimensional image is generated according to the second depth image and the second visible light image. As illustrated in FIG. 15, the non-coincidence region of the first depth image is the remaining region of the first depth image except the coincidence region, and the non-coincidence region of the first visible light image is the remaining region of the first visible light image except the coincidence region.

Figure 3:
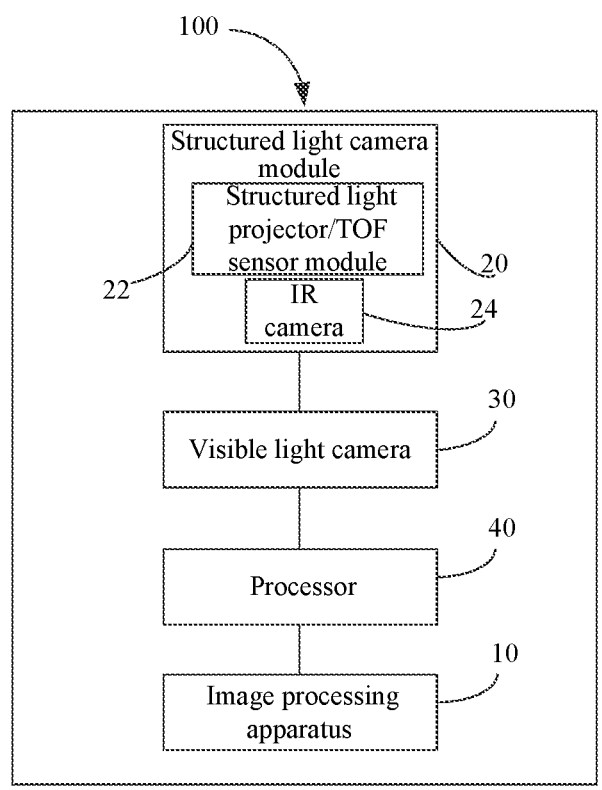
FIG. 3 illustrates a schematic structure diagram of an image capturing apparatus according to some embodiments of the disclosure.

Referring to FIG. 3 and FIG. 12, in some embodiments, the image processing method is applied to an image capturing apparatus 100. The image capturing apparatus 100 includes a visible light camera 30 and an IR camera 24. The coincidence region between the first depth image and the first visible light image and non-coincidence regions of the first depth image and the first visible light image are acquired according to a field of view of the visible light camera 30, a field of view of the IR camera 24 and a preset distance L between the visible light camera 30 and the IR camera 24.

Figure 5:
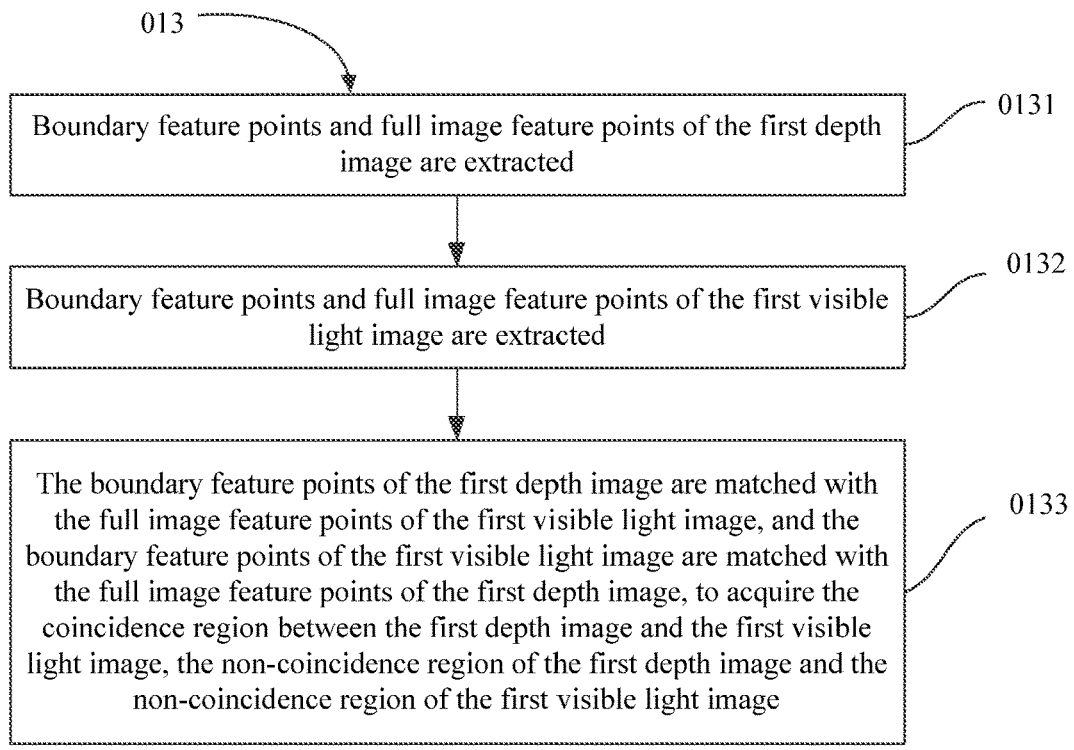
FIG. 5 illustrates a schematic flowchart of an image processing method according to some embodiments of the disclosure.

Referring to FIG. 5, in some embodiments, the operation at 013 includes the actions at 0131, 0132 and 0133. At 0131, boundary feature points and full image feature points of the first depth image are extracted. At 0132, boundary feature points and full image feature points of the first visible light image are extracted. At 0133, the boundary feature points of the first depth image are matched with the full image feature points of the first visible light image, and the boundary feature points of the first visible light image are matched with the full image feature points of the first depth image, to acquire the coincidence region between the first depth image and the first visible light image, the non-coincidence region of the first depth image and the non-coincidence region of the first visible light image.

Figure 13:
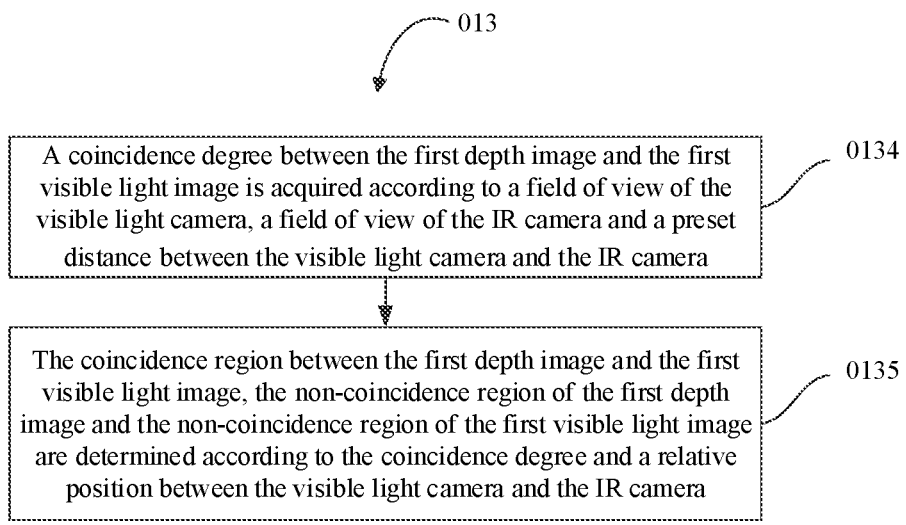
FIG. 13 illustrates a schematic flowchart of an image processing method according to some embodiments of the disclosure.

Referring to FIG. 3 and FIG. 13, in some embodiments, the image processing method is applied to an image capturing apparatus 100, and the image capturing apparatus 100 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree, and the coincidence degree is a ratio of a coincidence region between a depth image and a visible light image to the entire visible light image. The operation at 013 includes actions at 0134 and 0135. At 0134, a coincidence degree between the first depth image and the first visible light image is acquired according to the field of view of the visible light camera 30, the field of view of the IR camera 24 and the preset distance L. At 0135, the coincidence region between the first depth image and the first visible light image, the non-coincidence region of the first depth image and the non-coincidence region of the first visible light image are determined according to the coincidence degree and a relative position between the visible light camera 30 and the IR camera 24.

Referring to FIG. 15, in some embodiments, the image processing method is applied to an image capturing apparatus 100, and the image capturing apparatus 100 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree. The coincidence degree is a ratio of a coincidence region between the first depth image and the first visible light image to the entire first visible light image, and feature matching boundaries of the first depth image and the first visible light image are determined according to the coincidence degree and a relative position between the IR camera 24 and the visible light camera 30.

Referring to FIG. 3, an image capturing apparatus 100 of an embodiment of the disclosure includes a depth camera module 20, a visible light camera 30 and a processor 40. The depth camera module 20 is configured to capture a first depth image of a present scene. The visible light camera 30 is configured to capture a first visible light image of the present scene. The processor 40 is configured to acquire a coincidence region between the first depth image and the first visible light image, a non-coincidence region of the first depth image and a non-coincidence region of the first visible light image, remove the non-coincidence region of the first depth image from the first depth image to obtain a second depth image corresponding to the coincidence region, remove the non-coincidence region of the first visible light image from the first visible light image to obtain a second visible light image corresponding to the coincidence region, and generate a three-dimensional image according to the second depth image and the second visible light image.

Referring to FIG. 3 and FIG. 12, in some embodiments, the depth camera module 20 includes an IR camera 24. The coincidence region between the first depth image and the first visible light image and non-coincidence regions of the first depth image and the first visible light image are acquired according to a field of view of the visible light camera 30, a field of view of the IR camera 24 and a preset distance L between the visible light camera 30 and the IR camera 24.

Referring to FIG. 3, in some embodiments, the processor 40 may be further configured to extract boundary feature points and full image feature points of the first depth image, extract boundary feature points and full image feature points of the first visible light image, match the boundary feature points of the first depth image with the full image feature points of the first visible light image and match the boundary feature points of the first visible light image with the full image feature points of the first depth image to acquire the coincidence region between the first depth image and the first visible light image, the non-coincidence region of the first depth image and the non-coincidence region of the first visible light image.

Referring to FIG. 3, in some embodiments, the image capturing apparatus 100 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree, and the coincidence degree is a ratio of a coincidence region between the depth image and the visible light image to the entire visible light image. The processor 40 is further configured to acquire a coincidence degree between the first depth image and the first visible light image according to the field of view of the visible light camera 30, the field of view of the IR camera 24 and the preset distance L, and determine the coincidence region between the first depth image and the first visible light image, the non-coincidence region of the first depth image and the non-coincidence region of the first visible light image according to the coincidence degree and a relative position between the visible light camera 30 and the IR camera 24.

Referring to FIG. 15, in some embodiments, the image capturing apparatus 100 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree. The coincidence degree is a ratio of a coincidence region between the depth image and the visible light image to the entire visible light image, and feature matching boundaries of the first depth image and the first visible light image are determined according to the coincidence degree and a relative position between the IR camera 24 and the visible light camera 30.

Figure 17:
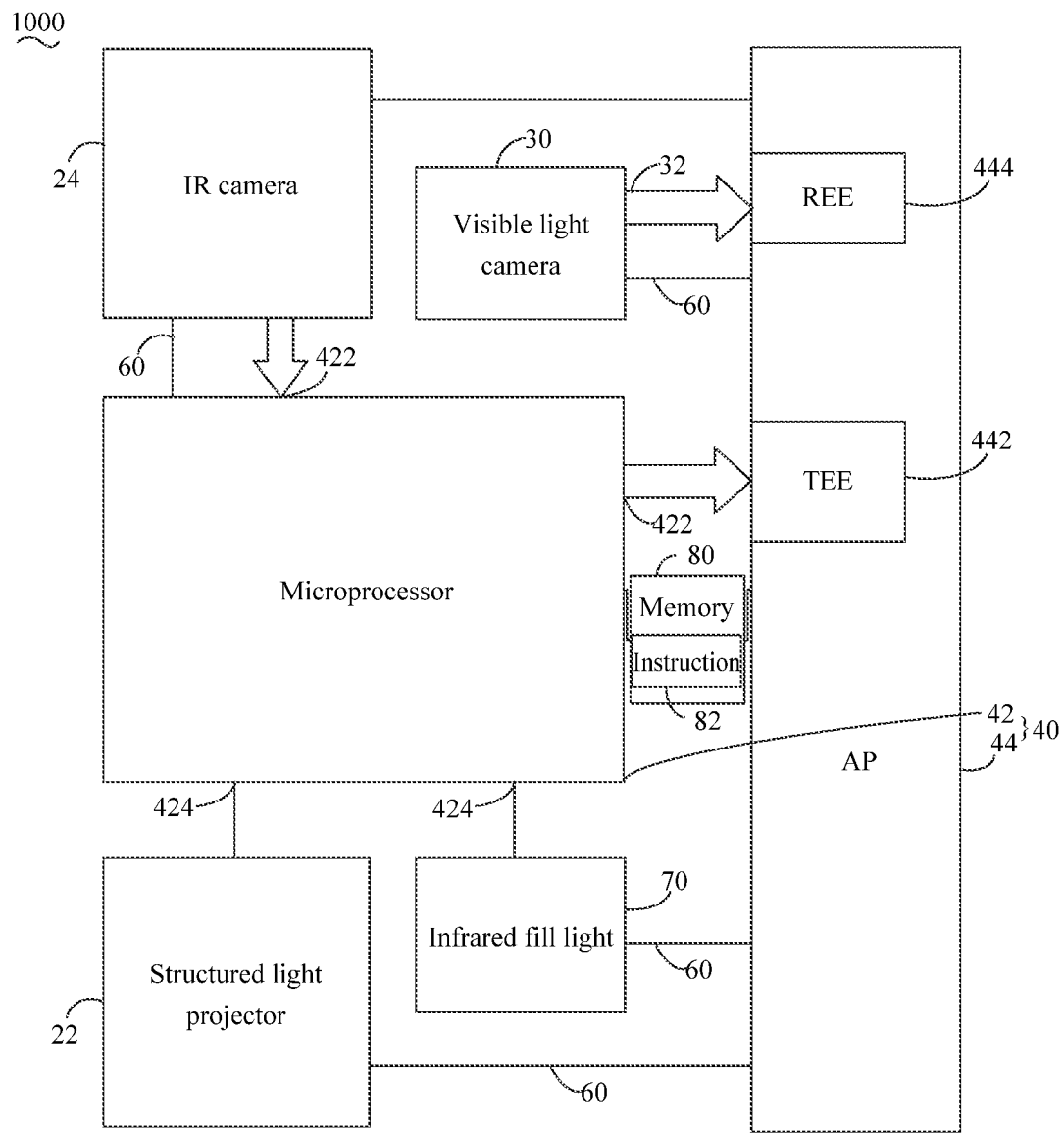
FIG. 17 illustrates a schematic module diagram of a computer device according to an embodiment of the disclosure.

Referring to FIG. 1 and FIG. 17, a computer device 1000 of an embodiment of the disclosure includes a memory 80 and a processor 40. The memory 80 stores a computer-readable instruction 82. The computer-readable instruction 82, when executed by the processor 40, enables the processor 40 to perform the following operations for image processing. At 011, a first depth image of a present scene is acquired. At 012, a first visible light image of the present scene is acquired. At 013, a coincidence region between the first depth image and the first visible light image, a non-coincidence region of the first depth image and a non-coincidence region of the first visible light image are acquired. At 014, the non-coincidence region of the first depth image is removed from the first depth image to obtain a second depth image corresponding to the coincidence region. At 015, the non-coincidence region of the first visible light image is removed from the first visible light image to obtain a second visible light image corresponding to the coincidence region. At 016, a three-dimensional image is generated according to the second depth image and the second visible light image.

Figure 4:
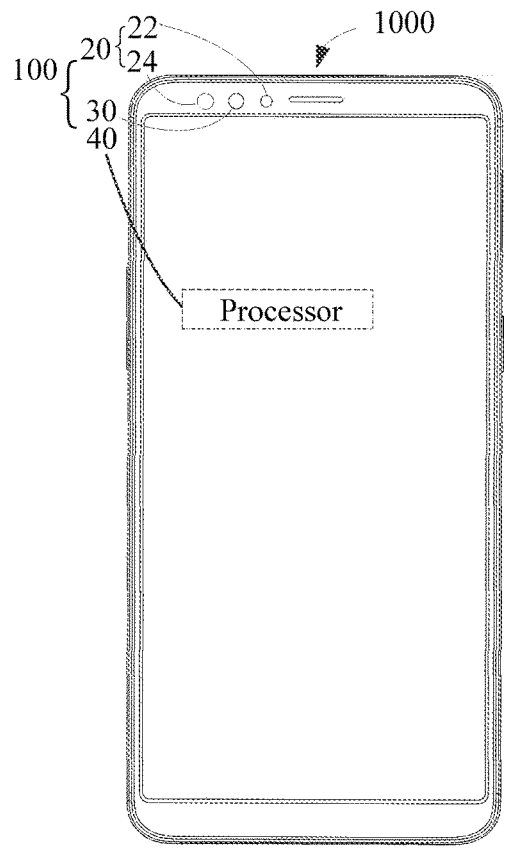
FIG. 4 illustrates a schematic structure diagram of a computer device according to some embodiments of the disclosure.

Referring to FIG. 4 and FIG. 12, in some embodiments, the computer device 1000 further includes a visible light camera 30 and an IR camera 24. The coincidence region between the first depth image and the first visible light image and non-coincidence regions of the first depth image and the first visible light image are acquired according to a field of view of the visible light camera 30, a field of view of the IR camera 24 and a preset distance L between the visible light camera 30 and the IR camera 24.

Referring to FIG. 5 and FIG. 17, in some embodiments, the computer-readable instruction 82, when executed by the processor 40, enables the processor 40 to further perform the following operations. At 0131, boundary feature points and full image feature points of the first depth image are extracted. At 0132, boundary feature points and full image feature points of the first visible light image are extracted. At 0133, the boundary feature points of the first depth image are matched with the full image feature points of the first visible light image, and the boundary feature points of the first visible light image are matched with the full image feature points of the first depth image, to acquire the coincidence region between the first depth image and the first visible light image, the non-coincidence region of the first depth image and the non-coincidence region of the first visible light image.

Referring to FIG. 13 and FIG. 17, in some embodiments, the computer device 1000 further includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree, and the coincidence degree is a ratio of a coincidence region between the depth image and the visible light image to the entire visible light image. The computer-readable instruction 82, when executed by the processor 40, enables the processor 40 to further perform the following operations. At 0134, a coincidence degree between the first depth image and the first visible light image is acquired according to the field of view of the visible light camera 30, the field of view of the IR camera 24 and the preset distance L. At 0135, the coincidence region between the first depth image and the first visible light image, the non-coincidence region of the first depth image and the non-coincidence region of the first visible light image are determined according to the coincidence degree and a relative position between the visible light camera 30 and the IR camera 24.

Referring to FIG. 15, in some embodiments, the computer device 1000 further includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree. The coincidence degree is a ratio of a coincidence region between the depth image and the visible light image to the entire visible light image, and feature matching boundaries of the first depth image and the first visible light image are determined according to the coincidence degree and a relative position between the IR camera 24 and the visible light camera 30.

Figure 16:
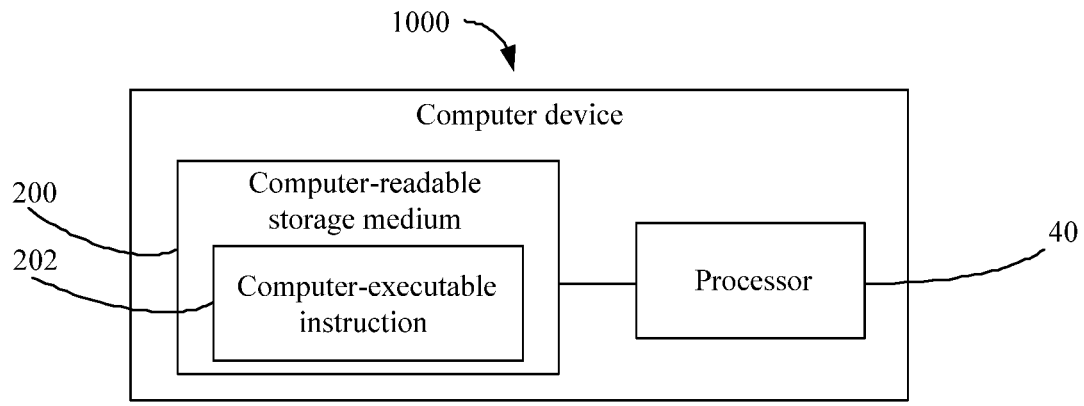
FIG. 16 illustrates a schematic module diagram of a computer-readable storage medium and a processor according to an embodiment of the disclosure.

Referring to FIG. 16, one or more non-volatile computer-readable storage media 200 provided in the disclosure includes one or more computer-executable instructions 202. The computer-executable instruction 202, when executed by one or more processors 40, enables the one or more processors 40 to perform the following operations for image processing. At 011, a first depth image of a present scene is acquired. At 012, a first visible light image of the present scene is acquired. At 013, a coincidence region between the first depth image and the first visible light image, a non-coincidence region of the first depth image and a non-coincidence region of the first visible light image are acquired. At 014, the non-coincidence region of the first depth image is removed from the first depth image to obtain a second depth image corresponding to the coincidence region. At 015, the non-coincidence region of the first visible light image is removed from the first visible light image to obtain a second visible light image corresponding to the coincidence region. At 016, a three-dimensional image is generated according to the second depth image and the second visible light image.

Referring to FIG. 4, FIG. 12 and FIG. 16, in some embodiments, the non-volatile computer-readable storage medium 200 is applied to a computer device 1000, and the computer device 1000 includes a visible light camera 30 and an IR camera 24. The coincidence region between the first depth image and the first visible light image and non-coincidence regions of the first depth image and the first visible light image are acquired according to a field of view of the visible light camera 30, a field of view of the IR camera 24 and a preset distance L between the visible light camera 30 and the IR camera 24.

Referring to FIG. 5 and FIG. 16, in some embodiments, the computer-executable instruction 202, when executed by the one or more processors 40, enables the one or more processors 40 to perform the following operations. At 0131, boundary feature points and full image feature points of the first depth image are extracted. At 0132, boundary feature points and full image feature points of the first visible light image are extracted. At 0133, the boundary feature points of the first depth image are matched with the full image feature point of the first visible light image, and the boundary feature points of the first visible light image are matched with the full image feature points of the first depth image, to acquire the coincidence region between the first depth image and the first visible light image, the non-coincidence region of the first depth image and the non-coincidence region of the first visible light image.

Referring to FIG. 4, FIG. 13 and FIG. 16, in some embodiments, the non-volatile computer-readable storage medium 200 is applied to a computer device 1000, and the computer device 1000 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree, and the coincidence degree is a ratio of a coincidence region between the depth image and the visible light image to the entire visible light image. The computer-executable instruction 202, when executed by the one or more processors 40, enables the one or more processors 40 to further perform the following operations. At 0134, a coincidence degree between the first depth image and the first visible light image is acquired according to the field of view of the visible light camera 30, the field of view of the IR camera 24 and the preset distance L. At 0135, the coincidence region between the first depth image and the first visible light image, the non-coincidence region of the first depth image and the non-coincidence region of the first visible light image are determined according to the coincidence degree and a relative position between the visible light camera 30 and the IR camera 24.

Referring to FIG. 15, in some embodiments, the non-volatile computer-readable storage medium 200 is applied to a computer device 1000, and the computer device 1000 includes a visible light camera 30 and an IR camera 24. A field of view of the visible light camera 30, a field of view of the IR camera 24 and a preset distance L between the visible light camera 30 and the IR camera 24 are in one-to-one correspondence with a preset coincidence degree. The coincidence degree is a ratio of a coincidence region between the depth image and the visible light image to the entire visible light image, and feature matching boundaries of the first depth image and the first visible light image are determined according to the coincidence degree and a relative position between the IR camera 24 and the visible light camera 30.

Referring to FIG. 1, the disclosure provides an image processing method. The image processing method includes the following operations.

At 011, a first depth image of a present scene is acquired.

At 012, a first visible light image of the present scene is acquired.

At 013, a coincidence region between the first depth image and the first visible light image, a non-coincidence region of the first depth image and a non-coincidence region of the first visible light image are acquired.

At 014, the non-coincidence region of the first depth image is removed from the first depth image to obtain a second depth image corresponding to the coincidence region.

At 015, the non-coincidence region of the first visible light image is removed from the first visible light image to obtain a second visible light image corresponding to the coincidence region.

At 016, a three-dimensional image is generated according to the second depth image and the second visible light image.

Figure 2:
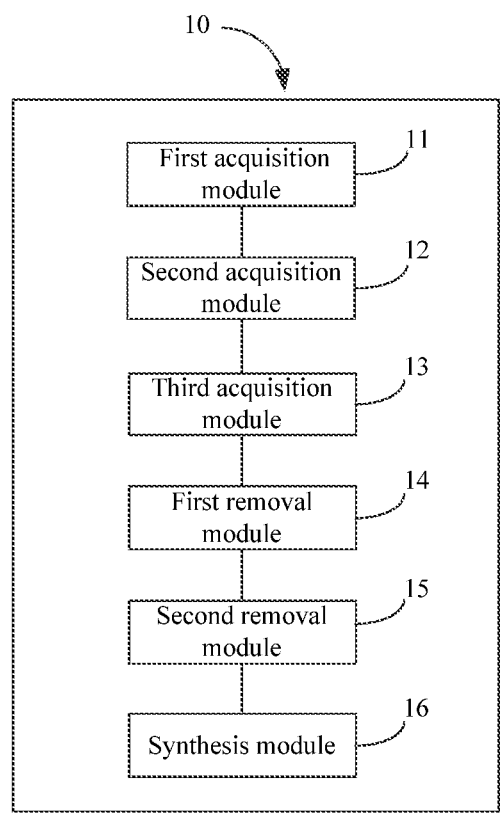
FIG. 2 illustrates a schematic module diagram of an image processing apparatus according to some embodiments of the disclosure.

Referring to FIG. 2 and FIG. 3, the disclosure also provides an image processing apparatus 10. In the present embodiment, the image processing apparatus 10 is applied in an image capturing apparatus 100, i.e., the image capturing apparatus 100 includes the image processing apparatus 10. In other embodiments, the image processing apparatus 10 may be provided in a computer device 1000. The image processing apparatus 10 includes a first acquisition module 11, a second acquisition module 12, a third acquisition module 13, a first removal module 14, a second removal module 15, and a synthesis module 16. The first acquisition module 11 is configured to acquire a first depth image. The second acquisition module 12 is configured to acquire a first visible light image. The third acquisition module 13 is configured to acquire a coincidence region between the first depth image and the first visible light image, a non-coincidence region of the first depth image and a non-coincidence region of the first visible light image. The first removal module 14 is configured to remove the non-coincidence region of the first depth image from the first depth image to obtain a second depth image corresponding to the coincidence region. The second removal module 15 is configured to remove the non-coincidence region of the first visible light image from the first visible light image to obtain a second visible light image corresponding to the coincidence region. The synthesis module 16 is configured to synthesize a three-dimensional image according to the second depth image and the second visible light image.

Referring to FIG. 3, the disclosure also provides an image capturing apparatus 100. The image capturing apparatus 100 includes a depth camera module 20, a visible light camera 30 and a processor 40. The depth camera module 20 is configured to capture a first depth image of a present scene. The visible light camera 30 is configured to capture a first visible light image of the present scene. The processor 40 is configured to acquire a coincidence region between the first depth image and the first visible light image, a non-coincidence region of the first depth image and a non-coincidence region of the first visible light image, remove the non-coincidence region of the first depth image from the first depth image to obtain a second depth image corresponding to the coincidence region, remove the non-coincidence region of the first visible light image from the first visible light image to obtain a second visible light image corresponding to the coincidence region, and synthesize a three-dimensional image according to the second depth image and the second visible light image.

That is to say, the operation at 011 may be implemented by the depth camera module 20. The operation at 012 may be implemented by the visible light camera 30. The operations at 013 to 016 may be implemented by the processor 40.

The image capturing apparatus 100 may be a front image capturing apparatus 100, or may be a rear image capturing apparatus 100.

Specifically, a three-dimensional image is generally generated by synthesizing a visible light image and a depth image. However, due to a certain distance between a visible light camera device and an IR camera device are mounted at a certain distance, the field of views of the visible light camera device and the IR camera device have non-coincidence areas, depth information cannot be obtained from the non-coincidence area, between the field of view of the visible light camera device and the field of view of the IR camera device, in the field of view of the visible light camera device, and visible light information cannot be obtained from the non-coincidence area in the field of view of the IR camera device. Therefore, when synthesizing a three-dimensional image, the three-dimensional image cannot be accurately synthesized since the non-coincidence area lacks relevant information, and when the distance between the visible light camera device and the IR camera device increases, the non-coincidence area becomes larger and thus seriously affects the synthesis of the three-dimensional image. In the embodiment of the disclosure, the image capturing apparatus 100 includes a depth camera module 20 and a visible light camera 30 (corresponding to the visible light camera device). The depth camera module 20 includes a structured light projector 22 and an IR camera 24 (corresponding to the IR camera device). The structured light projector 22 projects an IR pattern into a target scene. The IR camera 24 captures the IR pattern modified by a target object. The processor 40 calculates a first depth image of the IR pattern via an image matching algorithm. The visible light camera 30 is configured to capture a first visible light image of the target scene, and the first visible light image includes color information of each object in the target scene. The processor 40 performs processing on the first depth image and the first visible light image captured by the image capturing apparatus 100 to obtain a coincidence region between the first depth image and the first visible light image, a non-coincidence region of the first depth image and a non-coincidence region of the first visible light image, removes the non-coincidence region of the first depth image from the first depth image to obtain a second depth image, removes the non-coincidence region of the first visible light image from the first visible light image to obtain a second visible light image, and finally synthesizes the second depth image and the second visible light image to obtain a three-dimensional image. Since the three-dimensional image is only generated by synthesizing the second depth image in the coincidence region and the second visible light image in the coincidence region, during image synthesis, color information corresponding to any position on the second depth image may be found in the second visible light image, and similarly, depth information corresponding to any position on the second visible light image may be found in the second depth image. Therefore, the synthesized three-dimensional image is not affected by the non-coincidence regions in the field of views of the visible light camera 30 and the IR camera 24. The coincidence region refers to a region in which the field of view of the IR camera 24 overlaps with the field of view of the visible light camera 30, that is, a region where a depth image and a visible light image have the same scene. The non-coincidence region includes a non-coincidence region of the visible light image and a non-coincidence region of the depth image. The non-coincidence region of the visible light image only has a scene within the field of view of the visible light camera 30 and does not have a scene within the field of view of the IR camera 24. The non-coincidence region of the depth image only has a scene within the field of view of the IR camera 24 and does not have a scene within the field of view of the visible light camera 30.

In other alternative embodiments, the depth camera module 20 is a TOF sensor module 20, and the image capturing apparatus 100 includes the TOF sensor module 20 and the visible light camera 30. The TOF sensor module 20 includes a laser projector 22 and an IR camera 24. The laser projector 22 projects uniform light to the target scene, and the IR camera 24 receives the reflected light and records a time point of light emitting and a time point of light receiving. The processor 40 calculates depth pixel values corresponding to objects in the target scene according to the speed of light and a time difference between the time point of light emitting and the time point of light receiving, and combines the multiple depth pixel values to obtain a first depth image. The visible light camera 30 is configured to capture a first visible light image of the target scene, and the first visible light image includes color information of each object in the target scene. The processor 40 processes the first depth image and the first visible light image captured by the image capturing apparatus 100 to obtain a coincidence region between the first depth image and the first visible light image, a non-coincidence region of the first depth image and a non-coincidence region of the first visible light image, removes the non-coincidence region of the first depth image from the first depth image to obtain a second depth image, removes the non-coincidence region of the first visible light image from the first visible light image to obtain a second visible light image, and then synthesizes the second depth image and the second visible light image to obtain a three-dimensional image.

Certainly, the first depth image and the first visible light image may be obtained by a frame of image, and the first depth image may also be obtained by multiple frames of depth image, and the first visible light image may be obtained by multiple frames of visible light image. Thus, the more accurate depth image and visible light image are obtained.

Referring to FIG. 4, in the embodiments of the disclosure, the image capturing apparatus 100 may be applied to the computer device 1000 of the embodiment of the disclosure. That is, the computer device 1000 of the embodiment of the disclosure may include the image capturing apparatus 100 of the embodiment of the disclosure.

In some embodiments, the computer device 1000 includes a mobile phone, a tablet, a laptop, a smart bracelet, a smart watch, a smart helmet, smart glasses, and the like. In the embodiment of the disclosure, the computer device 1000 is exemplarily explained as a mobile phone for description.

According to the image processing method, the image processing apparatus 10 and the image capturing apparatus 100 of the embodiments of the disclosure, non-coincidence regions of a depth image and a visible light image are removed by determining a coincidence region between the depth image and the visible light image, and three-dimensional image synthesis is performed only on the coincidence region. Therefore, the influence of the non-coincidence regions in the depth image and the visible light image on the three-dimensional image synthesis is avoided.

Referring to FIG. 5, in some embodiments, the operation at 013 includes the following actions.

At 0131, boundary feature points and full image feature points of the first depth image are extracted.

At 0132, boundary feature points and full image feature points of the first visible light image are extracted.

At 0133, the boundary feature points of the first depth image are matched with the full image feature points of the first visible light image, and the boundary feature points of the first visible light image are matched with the full image feature points of the first depth image, to acquire the coincidence region between the first depth image and the first visible light image, the non-coincidence region of the first depth image and the non-coincidence region of the first visible light image.

Figure 6:
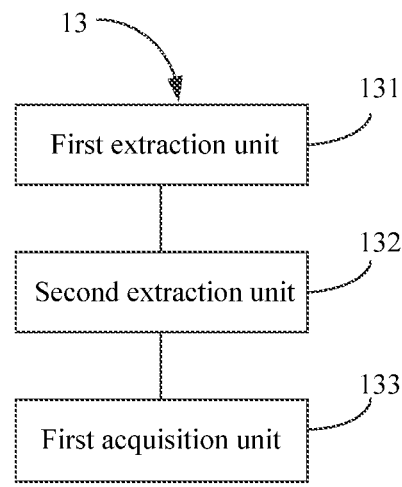
FIG. 6 illustrates a schematic module diagram of an image processing apparatus according to some embodiments of the disclosure.

Referring to FIG. 6, in some embodiments, the third acquisition module 13 further includes a first extraction unit 131, a second extraction unit 132 and a first acquisition unit 133. The first extraction unit 131 is configured to extract boundary feature points and full image feature points of the first depth image. The second extraction unit 132 is configured to extract boundary feature points and full image feature points of the first visible light image. The first acquisition unit 133 is configured to match the boundary feature points of the first depth image with the full image feature points of the first visible light image, and match the boundary feature points of the first visible light image and the full image feature points of the first depth image, to acquire the coincidence region between the first depth image and the first visible light image, the non-coincidence region of the first depth image and the non-coincidence region of the first visible light image.

The processor 40 is further configured to extract boundary feature points and full image feature points of the first depth image, extract boundary feature points and full image feature points of the first visible light image, and match the boundary feature points of the first depth image with the full image feature points of the first visible light image, and match the boundary feature points of the first visible light image with the full image feature points of the first depth image, to acquire the coincidence region between the first depth image and the first visible light image, the non-coincidence region of the first depth image and the non-coincidence region of the first visible light image.

That is, the actions at 0131 to 0133 may be implemented by the processor 40.

Figure 7:
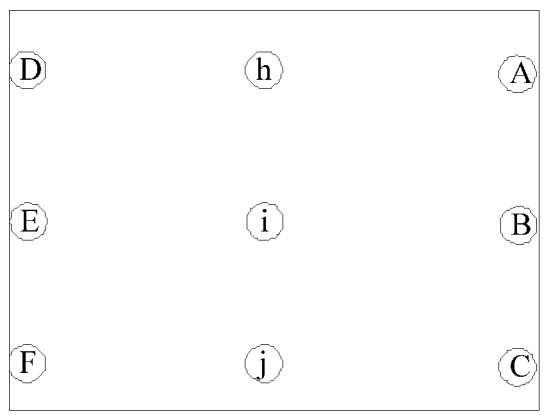
FIG. 7 illustrates a schematic diagram of the principle of an image processing method according to some embodiments of the disclosure.
Figure 8:
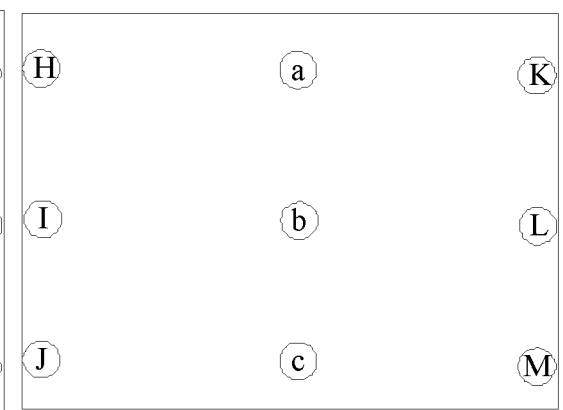
FIG. 8 illustrates a schematic diagram of the principle of an image processing method according to some embodiments of the disclosure.
Figure 9:
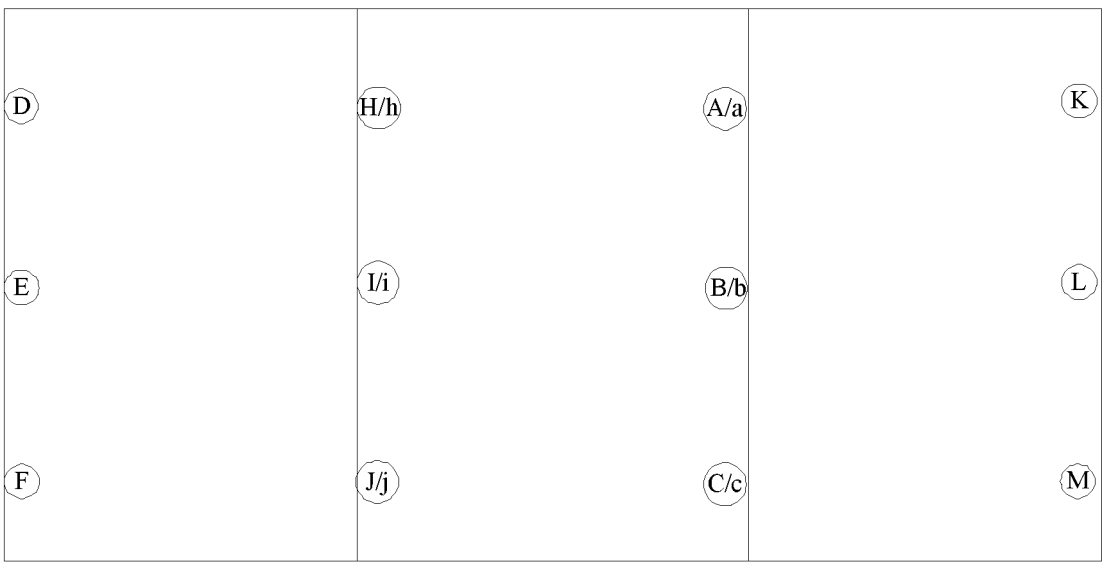
FIG. 9 illustrates a schematic diagram of the principle of an image processing method according to some embodiments of the disclosure.

Specifically, a field angle includes a horizontal field angle α and a vertical field angle β, the horizontal field angle α and the vertical field angle β determine a field of view. In the embodiments of the disclosure, the vertical field angles β of the IR camera 24 and the visible light camera 30 are the same while the horizontal field angles α are different. The principles are similar in the cases that the horizontal field angles α of the IR camera 24 and the visible light camera 30 are the same while the vertical field angles β are different, and the horizontal field angles and the vertical field angles β of the IR camera 24 and the visible light camera 30 are different. Descriptions are not repeated herein. When determining a coincidence region and a non-coincidence region, boundary feature points of the first depth image are extracted, and then the boundary feature points of the first depth image are matched with full image feature points of the visible light image, that is, a region, coinciding with the depth image, in the visible light image is found. Boundary feature points of the visible light image are extracted, the boundary feature points of the visible light image are matched with full image feature points of the depth image, and a region, coinciding with the visible light image, in the depth image is found. Therefore, the coincidence region and the non-coincidence region between the first depth image and the first visible light image are determined. For example, referring to FIG. 7 and FIG. 8, FIG. 7 is a first depth image, and FIG. 8 is a first visible light image. Because the vertical field angles of the images are the same, the upper and lower boundaries of the depth image are overlapped with respective upper and lower boundaries of the visible light image. Feature points of a left boundary of the first depth image are D, E and F, and feature points of a right boundary are A, B and C. Feature points of a left boundary of the first visible light image are H, I and J, and feature points of a right boundary are K, L and M. The boundary feature points of the first visible light image are matched with the full image feature points of the first depth image. The feature points H, I and J of the left boundary of the first visible light image are matched with feature points h, i and j in the full image feature points of the first depth image, and the feature points of the right boundary of the first visible light image have no matching point in the full image feature points of the first depth image. Thus, as illustrated in FIG. 9 and FIG. 10, the coincidence region of the first depth image can be obtained. The boundary feature points of the first depth image are matched with the full image feature points of the first visible light image. The feature points of the left boundary of the first depth image have no matching point in the full image feature points of the first visible light image, and the feature points A, B and C of the right boundary of the first depth image are matched with feature points a, b and c in the full image feature points of the first visible light image. Thus, as illustrated in FIG. 9 and FIG. 11, the coincidence region of the first visible light image can be obtained. The coincidence region of the first visible light image is the same as the coincidence region of the first depth image. Thus, the coincidence region between the first depth image and the first visible light image is accurately determined according to the matching of the feature points, thereby improving the accuracy of the three-dimensional image synthesis.

Referring to FIG. 12, in some embodiments, a coincidence region between the first depth image and the first visible light image, a non-coincidence region of the first depth image and a non-coincidence region of the first visible light image are acquired according to a field of view of the visible light camera 30, a field of view of the IR camera 24 and a preset distance L between the visible light camera 30 and the IR camera 24.

Specifically, when the image capturing apparatus 100, is in the factory, the field of view of the visible light camera 30, the field of view of the IR camera 24 and the preset distance L between the visible light camera 30 and the IR camera 24 are determined, and the sizes of the coincidence region and the non-coincidence region between the depth image and the visible light image have a correspondence with the field of view of the visible light camera 30, the field of view of the IR camera 24 and the preset distance L between the visible light camera 30 and the IR camera 24. For example, when both the field of view of the visible light camera 30 and the field of view of the IR camera 24 are unchanged, as the preset distance L between the visible light camera 30 and the IR camera 24 is increasing, the coincidence region between the depth image and the visible light image is smaller while the non-coincidence region is larger. For another example, when the field of view of the visible light camera 30 is unchanged and the preset distance L between the visible light camera 30 and the IR camera 24 is unchanged, as the field of view of the IR camera 24 is increasing, the coincidence region between the depth image and the visible light image also increases while the non-coincidence region decreases. For another example, when the field of view of the IR camera 24 is unchanged and the preset distance L between the visible light camera 30 and the IR camera 24 is unchanged, as the field of view of the visible light camera 30 is increasing, the coincidence region between the depth image and the visible light image also increases while the non-coincidence region decreases. After the field of view of the visible light camera 30, the field of view of the IR camera 24 and the preset distance L between the visible light camera 30 and the IR camera 24 are determined, the coincidence region and the non-coincidence region between the first depth image and the first visible light image can be determined.

Thus, the size of the coincidence region and the non-coincidence region between the first depth image and the first visible light image can be determined according to the field of view of the visible light camera 30, the field of view of the IR camera 24 and the preset distance L between the visible light camera 30 and the IR camera 24 at the factory. The algorithm is simple, so that the coincidence region and the non-coincidence region are quickly determined, and the speed of the three-dimensional image synthesis is improved.

Referring to FIG. 13, in some embodiments, a field of view of the visible light camera 30, a field of view of the IR camera 24 and a preset distance L between the visible light camera 30 and the IR camera 24 are in one-to-one correspondence with a preset coincidence degree, and the coincidence degree is a ratio of a coincidence region between the depth image and the visible light image to the visible light image. The operation at 013 includes the following actions.

At 0134, a coincidence degree between the first depth image and the first visible light image is acquired according to the field of view of the visible light camera 30, the field of view of the IR camera 24 and the preset distance L.

At 0135, the coincidence region between the first depth image and the first visible light image, the non-coincidence region of the first depth image and the non-coincidence region of the first visible light image are determined according to the coincidence degree and a relative position between the visible light camera 30 and the IR camera 24.

Figure 14:
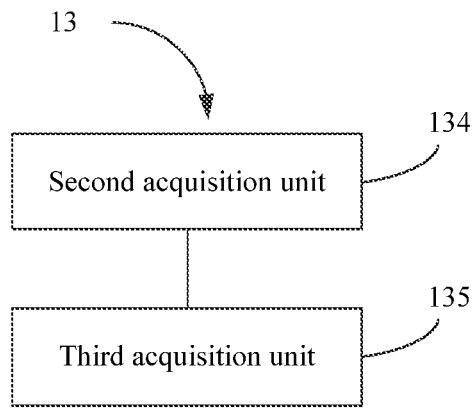
FIG. 14 illustrates a schematic module diagram of an image processing apparatus according to some embodiments of the disclosure.

Referring to FIG. 14, the third acquisition module 13 further includes a second acquisition unit 134 and a third acquisition unit 135. The second acquisition unit 134 is configured to acquire a coincidence degree between the first depth image and the first visible light image according to the field of view of the visible light camera 30, the field of view of the IR camera 24 and the preset distance L. The third acquisition unit 135 is configured to determine the coincidence region between the first depth image and the first visible light image, the non-coincidence region of the first depth image and the non-coincidence region of the first visible light image according to the coincidence degree and a relative position between the visible light camera 30 and the IR camera 24.

The processor 40 may be further configured to acquire a coincidence degree between the first depth image and the first visible light image according to the field of view of the visible light camera 30, the field of view of the IR camera 24 and the preset distance L, and determine the coincidence region between the first depth image and the first visible light image, the non-coincidence region of the first depth image and the non-coincidence region of the first visible light image according to the coincidence degree and a relative position between the visible light camera 30 and the IR camera 24.

That is, the actions at 0134 and 0135 may be implemented by the processor 40.

Specifically, as illustrated in FIG. 15, when the image capturing apparatus 100 is in the factory, a coincidence degree can be accurately determined according to a one-to-one correspondence between the preset coincidence degree the field of view of the visible light camera 30 of the image capturing apparatus 100, the field of view of the IR camera 24 of the image capturing apparatus 100 and the preset distance L between the visible light camera 30 and the IR camera 24. After the coincidence degree is determined, a ratio of the coincidence region to the first depth image is calculated according to the coincidence degree, a ratio of the field of view of the visible light camera 30 (i.e., the horizontal field angle of the visible light camera 30 due to the case that the vertical field angle of the visible light camera 30 is equal to the vertical field angle of the IR camera 24) to the field of view of the IR camera 24 (i.e., the horizontal field angle of the IR camera 24 due to the case that the vertical field angle of the visible light camera 30 is equal to the vertical field angle of the IR camera 24). Then, the location of the coincidence region in the first visible light image and the location of the coincidence region in the first depth image are determined according to a relative position between the visible light camera 30 and the IR camera 24, and the coincidence region and the non-coincidence region between the first visible light image and the first depth image are finally determined. In one example, when the preset distance L between the visible light camera 30 and the IR camera 24 is 20 CM, the horizontal field angle of the visible light camera 30 is 40 degrees, and the horizontal field angle of the IR camera 24 is 50 degrees. The coincidence degree can be determined. For example, the coincidence degree is 65%. After the coincidence degree is determined, a ratio of the coincidence region to the first depth image is calculated according to the coincidence degree, the horizontal field angle of the visible light camera 30 and the horizontal field angle of the IR camera 24, that is, the ratio is 40*65%/50=52%. Then, according to the relative position between the IR camera 24 and the visible light camera 30, as illustrated in FIG. 15, the IR camera 24 is located on the left side of the visible light camera 30, 52% of the region from right to left of the first depth image is the coincidence region of the first depth image, and 65% of the region from left to right of the first visible light image is the coincidence region of the first visible light image. Thus, the coincidence region and the non-coincidence region between the first visible light image and the first depth image can be quickly and accurately determined.

Referring to FIG. 15 again, in some embodiments, feature matching boundaries of the first depth image and the first visible light image are determined according to the coincidence degree and the relative position between the IR camera 24 and the visible light camera 30.

Specifically, in one example, the vertical field angle of the IR camera 24 is equal to the vertical field angle of the visible light camera 30. The IR camera 24 is located on the left side of the visible light camera 30. The coincidence degree is less than 100% (that is, both the first depth image and the first visible light image have a coincidence region and a non-coincidence region, as illustrated in FIG. 15). For example, the coincidence degree is 65%. In such case, the left boundary of the first depth image is located in the non-coincidence region, the right boundary of the first visible light image is located in the non-coincidence region, and feature matching is not required. It is only necessary to perform feature matching of feature points on the right boundary of the first depth image with feature points of the first visible light image, and perform feature matching of feature points on the left boundary of the first visible light image with feature points of the depth image, thereby obtaining the coincidence region between the first depth image and the first visible light image, the non-coincidence region of the first depth image and the non-coincidence region of the first visible light image. Similarly, when the IR camera 24 is located on the right side of the visible light camera 30, it is only necessary to perform feature matching of feature points on the left boundary of the first depth image with feature points of the first visible light image, and perform feature matching of feature points on the right boundary of the first visible light image with feature points of the first depth image. Thus, it is not necessary to perform feature matching on all the boundaries of the first depth image and the first visible light image, so that the amount of calculation is reduced to improve the image processing speed.

Referring to FIG. 16, the embodiment of the disclosure also provides a computer-readable storage medium 200. The computer-readable storage medium 200 is applied to a computer device 1000. One or more non-volatile computer-readable storage media 200 include a computer-executable instruction 202. The computer-executable instruction 202, when executed by one or more processors 40, enables the one or more processors 40 to perform the image processing method in any one of the embodiments. For example, at 011, a first depth image of a present scene is acquired. At 012, a first visible light image of the present scene is acquired. At 013, a coincidence region between the first depth image and the first visible light image, a non-coincidence region of the first depth image and a non-coincidence region of the first visible light image are acquired. At 014, the non-coincidence region of the first depth image is removed from the first depth image to obtain a second depth image corresponding to the coincidence region. At 015, the non-coincidence region of the first visible light image is removed from the first visible light image to obtain a second visible light image corresponding to the coincidence region. At 016, a three-dimensional image is generated according to the second depth image and the second visible light image.

Referring to FIG. 17, the embodiment of the disclosure provides a computer device 1000. The computer device 1000 may be a mobile phone, a tablet, a smart watch, a smart bracelet, a smart wearable device or the like. In the embodiments of the disclosure, the computer device 1000 is exemplarily explained as a mobile phone for description. It is to be understood that the specific form of the computer device 1000 is not limited to the mobile phone. The computer device 1000 includes a structured light projector 22, an IR camera 24, a visible light camera 30, an infrared fill light 70, a processor 40, and a memory 80. The processor 40 includes a microprocessor 42 and an Application Processor (AP) 44.

A visible light image of a target object may be captured by the visible light camera 30, and the visible light camera 30 may be connected to the AP 44 via an Inter-Integrated Circuit (I2C) bus 60 and a Mobile Industry Processor Interface (MIPI) 32. The AP 44 may be configured to enable the visible light camera 30, disable the visible light camera 30 or reset the visible light camera 30. The visible light camera 30 may be configured to capture a color image, and the AP 44 acquires the color image from the visible light camera 30 through the MIPI 32 and stores the color image into a Rich Execution Environment (REE) 444.

An infrared image of the target object may be captured by the IR camera 24, the IR camera 24 may be connected to the AP 44, and the AP 44 may be configured to control power up of the IR camera 24, power down (pwdn) of the IR camera 24 or reset of the IR camera 24. Moreover, the IR camera 24 may be further connected to the microprocessor 42. The microprocessor 42 may be connected to the IR camera 24 through the I2C bus 60. The microprocessor 42 may provide a clock signal for capturing an infrared image to the IR camera 24, and the infrared image captured by the IR camera 24 may be transmitted into the microprocessor 42 through an MIPI 422. The infrared fill light 70 may be configured to emit infrared light, and the infrared light is received by the IR camera 24 after being reflected by a user. The infrared fill light 70 may be connected to the AP 44 through the I2C bus 60, and the AP 44 may be configured to enable the infrared fill light 70. The infrared fill light 70 may be further connected to the microprocessor 42. Specifically, the infrared fill light 70 may be connected to a Pulse Width Modulation (PWM) interface 424 of the microprocessor 42.

The structured light projector 22 may project laser light onto the target object. The structured light projector 22 may be connected to the AP 44, and the AP 44 may be configured to enable the structured light projector 22 and connect to the structured light projector 22 through the I2C bus 60. The structured light projector 22 may also be connected to the microprocessor 42. Specifically, the structured light projector 22 may be connected to the PWM interface 424 of the microprocessor 42.

The microprocessor 42 may be a processing chip, and the microprocessor 42 is connected to the AP 44. Specifically, the AP 44 may be configured to reset the microprocessor 42, wake up the microprocessor 42, debug the microprocessor 42 and the like. The microprocessor 42 may be connected to the AP 44 via the MIPI 422. Specifically, the microprocessor 42 is connected to a Trusted Execution Environment (TEE) 442 of the AP 44 through the MIPI 422, to transmit data in the microprocessor 42 directly to the TEE 442 for storage. Code and memory regions in the TEE 442 are both controlled by an access control unit and cannot be accessed by programs in the REE 444. Both the TEE 442 and the REE 444 may be formed in the AP 44.

The microprocessor 42 may acquire an infrared image by receiving the infrared image captured by the IR camera 24. The microprocessor 42 may transmit the infrared image to the TEE 442 through the MIPI 422, and the infrared image output from the microprocessor 42 does not enter into the REE 444 of the AP 44, so that the infrared image is not acquired by other programs, thereby improving the information security of the computer device 1000. The infrared image stored in the TEE 442 may be used as an infrared template.

The microprocessor 42 controls the structured light projector 22 to project laser light onto the target object, and then controls the IR camera 24 to capture a laser pattern modulated by the target object, and the microprocessor 42 acquires the laser pattern through the MIPI 422. The microprocessor 42 processes the laser pattern to obtain a depth image. Specifically, calibration information of the laser light projected by the structured light projector 22 may be stored in the microprocessor 42. The microprocessor 42 obtains depth information of different locations of the target object by processing the laser pattern and the calibration information, and generates a depth image. The obtained depth image is transmitted into the TEE 442 through the MIPI 422. The depth image stored in the TEE 442 may be used as a depth template.

In the computer device 1000, the obtained infrared template and depth template are stored in the TEE 442. A verification template in the TEE 442 is not easily falsified and stolen, and information in the computer device 1000 is more secure.

In one example, the microprocessor 42 and the AP 44 may be two separate single-body structures. In another example, the microprocessor 42 and the AP 44 may be integrated into a single-body structure to form a processor 40.

The processor 40 in FIG. 17 may be used to implement the image processing method according to any of the above embodiments. For example, the processor 40 may be configured to perform the following operations. At 011, a first depth image of a present scene is acquired. At 012, a first visible light image of the present scene is acquired. At 013, a coincidence region between the first depth image and the first visible light image, a non-coincidence region of the first depth image and a non-coincidence region of the first visible light image are acquired. At 014, the non-coincidence region of the first depth image is removed from the first depth image to obtain a second depth image corresponding to the coincidence region. At 015, the non-coincidence region of the first visible light image is removed from the first visible light image to obtain a second visible light image corresponding to the coincidence region. At 016, a three-dimensional image is synthesized according to the second depth image and the second visible light image. For another example, the processor 40 in FIG. 17 may be used to further implement the following operations. At 0131, boundary feature points and full image feature points of the first depth image are extracted. At 0132, boundary feature points and full image feature points of the first visible light image are extracted. At 0133, the boundary feature points of the first depth image are matched with the full image feature points of the first visible light image, and the boundary feature points of the first visible light image are matched with the full image feature points of the first depth image, to acquire the coincidence region between the first depth image and the first visible light image, the non-coincidence region of the first depth image and the non-coincidence region of the first visible light image. For another example, the processor 40 in FIG. 17 may be used to further implement the following operations. At 0134, a coincidence degree between the first depth image and the first visible light image is acquired according to the field of view of the visible light camera 30, the field of view of the IR camera 24 and the preset distance L. At 0135, the coincidence region between the first depth image and the first visible light image, the non-coincidence region of the first depth image and the non-coincidence region of the first visible light image are determined according to the coincidence degree and a relative position between the visible light camera 30 and the IR camera 24.

The memory 80 is connected to both the microprocessor 42 and the AP 44. The memory 80 stores a computer-readable instruction 82, and when the computer-readable instruction 82 is executed by the processor 40, the processor 40 performs the image processing method according to any of the above embodiments. Specifically, the microprocessor 42 may be configured to perform the operation in 011, and the AP 44 is configured to perform the operations in 011, 012, 013, 014, 015, 016, 0131, 0132, 0133, 0134, and 0135. Alternatively, the microprocessor 42 may be configured to perform the operations in 011, 012, 013, 014, 015, 016, 0131, 0132, 0133, 0134, and 0135. Alternatively, the microprocessor 42 may be configured to perform any one of the operations in 011, 012, 013, 014, 015, 016, 0131, 0132, 0133, 0134 and 0135, and the AP 44 is configured to perform the remaining operations in 011, 012, 013, 014, 015, 016, 0131, 0132, 0133, 0134 and 0135.

According to the non-volatile computer-readable storage medium 200 and the computer device 1000 of the embodiments of the disclosure, a non-coincidence region of a depth image and a non-coincidence region of a visible light image are removed by determining a coincidence region between the depth image and the visible light image, and three-dimensional image synthesis is performed only on the coincidence region, so that the influence of the non-coincidence portions in the depth image and the visible light image on the three-dimensional image synthesis is avoided.

While the embodiments of the disclosure have been illustrated and described above, it is to be understood that the above embodiments are illustrative and not intended to limit the scope of the disclosure. Any variations, modifications, alterations and replacements of the above embodiments may be made by those skilled in the art within the scope of the disclosure. The scope of the disclosure shall be defined by the claims and their equivalents.

The invention claimed is:

1. An image processing method, wherein the image processing method is applied to an image capturing apparatus, the image capturing apparatus comprises a visible light camera and an Infrared Radiation (IR) camera, the image processing method comprising:
    acquiring a first depth image and a first visible light image of a present scene;
    acquiring a coincidence region between the first depth image and the first visible light image, a non-coincidence region of the first depth image and a non-coincidence region of the first visible light image, comprising:
(a) extracting boundary feature points and full image feature points of the first depth image;
extracting boundary feature points and full image feature points of the first visible light image; and
matching the boundary feature points of the first depth image with the full image feature points of the first visible light image and matching the boundary feature points of the first visible light image with the full image feature points of the first depth image, to acquire the coincidence region between the first depth image and the first visible light image, the non-coincidence region of the first depth image and the non-coincidence region of the first visible light image;
or
(b) acquiring a preset coincidence degree between the first depth image and the first visible light image according to a field of view of the visible light camera, a field of view of the IR camera and a preset distance between the visible light camera and the IR camera, wherein the field of view of the visible light camera, the field of view of the IR camera and the preset distance are proportional to the preset coincidence degree, the preset coincidence degree being a ratio of a coincidence region between a depth image and a visible light image to the visible light image; and
determining the coincidence region between the first depth image and the first visible light image, the non-coincidence region of the first depth image and the non-coincidence region of the first visible light image according to the coincidence degree and a relative position between the visible light camera and the IR camera;
removing the non-coincidence region of the first depth image from the first depth image to obtain a second depth image corresponding to the coincidence region;
removing the non-coincidence region of the first visible light image from the first visible light image to obtain a second visible light image corresponding to the coincidence region; and
generating a three-dimensional image according to the second depth image and the second visible light image.

2. The image processing method according to claim 1, wherein in (a), a field of view of the visible light camera, a field of view of the IR camera and a preset distance between the visible light camera and the IR camera are proportional to a preset coincidence degree, the coincidence degree is a ratio of a coincidence region between a depth image and a visible light image to the visible light image, and feature matching boundaries of the first depth image and the first visible light image are determined according to the coincidence degree and a relative position between the IR camera and the visible light camera.

3. A computer device, comprising a memory, a processor, a visible light camera and an Infrared Radiation (IR) camera, wherein the memory storing a computer-readable instruction that, when executed by the processor, causes the processor to execute operations for image processing comprising:
acquiring a first depth image and a first visible light image of a present scene;
acquiring a coincidence region between the first depth image and the first visible light image, a non-coincidence region of the first depth image and a non-coincidence region of the first visible light image, comprising:
(a) extracting boundary feature points and full image feature points of the first depth image;
extracting boundary feature points and full image feature points of the first visible light image; and
matching the boundary feature points of the first depth image with the full image feature points of the first visible light image and matching the boundary feature points of the first visible light image with the full image feature points of the first depth image, to acquire the coincidence region between the first depth image and the first visible light image, the non-coincidence region of the first depth image and the non-coincidence region of the first visible light image;
or
(b) acquiring a preset coincidence degree between the first depth image and the first visible light image according to a field of view of the visible light camera, a field of view of the IR camera and a preset distance between the visible light camera and the IR camera, wherein the field of view of the visible light camera, the field of view of the IR camera and the preset distance are proportional to the preset coincidence degree, the preset coincidence degree being a ratio of a coincidence region between a depth image and a visible light image to the visible light image; and
determining the coincidence region between the first depth image and the first visible light image, the non-coincidence region of the first depth image and the non-coincidence region of the first visible light image according to the coincidence degree and a relative position between the visible light camera and the IR camera;
removing the non-coincidence region of the first depth image from the first depth image to obtain a second depth image corresponding to the coincidence region;
removing the non-coincidence region of the first visible light image from the first visible light image to obtain a second visible light image corresponding to the coincidence region; and
generating a three-dimensional image according to the second depth image and the second visible light image.

4. The computer device according to claim 3, wherein in (a), a field of view of the visible light camera, a field of view of the IR camera and a preset distance between the visible light camera and the IR camera are proportional to a preset coincidence degree, the coincidence degree is a ratio of a coincidence region between a depth image and a visible light image to the visible light image, and feature matching boundaries of the first depth image and the first visible light image are determined according to the coincidence degree and a relative position between the IR camera and the visible light camera.

5. A non-transitory computer-readable storage medium, wherein the non-transitory and non-volatile computer-readable storage medium is applied to a computer device, the computer device comprises a visible light camera and an Infrared Radiation (IR) camera, and wherein the non-transitory and non-volatile computer-readable storage medium comprises computer-executable instructions that, when executed by one or more processors, cause the one or more processors to perform operations for image processing comprising:

acquiring a first depth image and a first visible light image of a present scene;

acquiring a coincidence region between the first depth image and the first visible light image, a non-coincidence region of the first depth image and a non-coincidence region of the first visible light image, comprising:

(a) extracting boundary feature points and full image feature points of the first depth image;

extracting boundary feature points and full image feature points of the first visible light image; and matching the boundary feature points of the first depth image with the full image feature points of the first visible light image and matching the boundary feature points of the first visible light image with the full image feature points of the first depth image, to acquire the coincidence region between the first depth image and the first visible light image, the non-coincidence region of the first depth image and the non-coincidence region of the first visible light image;

or (b) acquiring a preset coincidence degree between the first depth image and the first visible light image according to a field of view of the visible light camera, a field of view of the IR camera and a preset distance between the visible light camera and the IR camera, wherein the field of view of the visible light camera, the field of view of the IR camera and the preset distance are proportional to the preset coincidence degree, the preset coincidence degree being a ratio of a coincidence region between a depth image and a visible light image to the visible light image; and determining the coincidence region between the first depth image and the first visible light image, the non-coincidence region of the first depth image and the non-coincidence region of the first visible light image according to the coincidence degree and a relative position between the visible light camera and the IR camera;

removing the non-coincidence region of the first depth image from the first depth image to obtain a second depth image corresponding to the coincidence region;

removing the non-coincidence region of the first visible light image from the first visible light image to obtain a second visible light image corresponding to the coincidence region; and generating a three-dimensional image according to the second depth image and the second visible light image.

6. The non-transitory computer-readable storage medium according to claim 5, wherein in (a), a field of view of the visible light camera, a field of view of the IR camera and a preset distance between the visible light camera and the IR camera are proportional to a preset coincidence degree, the coincidence degree is a ratio of a coincidence region between a depth image and a visible light image to the visible light image, and feature matching boundaries of the first depth image and the first visible light image are determined according to the coincidence degree and a relative position between the IR camera and the visible light camera.

* * * * *